United States Patent [19]

US008929596B2

(12) United States Patent (10) Patent No.: US 8,929,596 B2
Kritt et al. (45) Date of Patent: Jan. 6, 2015

(54) SURVEILLANCE INCLUDING A MODIFIED VIDEO DATA STREAM

(75) Inventors: Barry A. Kritt, Raleigh, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 100 days.

(21) Appl. No.: 13/487,975

(22) Filed: Jun. 4, 2012

(65) Prior Publication Data

US 2013/0322684 A1 Dec. 5, 2013

(51) Int. Cl.
*G06K 9/00* (2006.01)
(52) U.S. Cl.
USPC ............................................. 382/103
(58) Field of Classification Search
None
See application file for complete search history.

(56) References Cited

U.S. PATENT DOCUMENTS

| | | | |
|---|---|---|---|
| 4,922,339 A | 5/1990 | Stout et al. | |
| 7,224,956 B1 | 5/2007 | O'Neil | |
| 7,421,097 B2 | 9/2008 | Hamza et al. | |
| 7,787,664 B2* | 8/2010 | Luo et al. | 382/118 |
| 7,929,017 B2 | 4/2011 | Aggarwal et al. | |
| 8,289,390 B2 | 10/2012 | Aggarwal et al. | |
| 2003/0190090 A1* | 10/2003 | Beeman et al. | 382/284 |
| 2005/0063566 A1 | 3/2005 | Beek et al. | |
| 2006/0122995 A1* | 6/2006 | Shimizu et al. | 707/4 |
| 2007/0064813 A1 | 3/2007 | Fanfelle | |
| 2008/0211915 A1 | 9/2008 | McCubbrey | |
| 2010/0245382 A1* | 9/2010 | Sio | 345/593 |
| 2011/0115909 A1 | 5/2011 | Sternberg et al. | |
| 2011/0234847 A1* | 9/2011 | Bigioi et al. | 348/229.1 |
| 2011/0298929 A1 | 12/2011 | Garcia et al. | |

FOREIGN PATENT DOCUMENTS

WO 0197524 12/2001

OTHER PUBLICATIONS

Melten Demirkus, Kshitiz Garg, Sadiye Guler, "Automated Person Categorization for Video Surveillance Using Soft Biometrics", 2010, Biometric Technology for Human Identification VII, Proc. of SPIE vol. 7667, pp. 1-12.*
Luca Marchesotti et al., Position Estimation and Tracking with a Network of Heterogeneous Sensors in Video Surveillance Applications, 4 pages, DIBE—University of Genoa, Genoa, Italy.
Mubarak Shah et al., Detection and tracking of objects from multiple airborne cameras, 2006, 3 pages, SPIE.
Avigilon, Wider World: Ultra Wide Angle Surveillance, 4 pages.
CVLab—Computer Vision Laboratory, "EPFL" data set: Multi-camera Pedestrian Videos, Feb. 22, 2012, 4 pages, http://cvlab.epfl.ch/data/pom.

(Continued)

*Primary Examiner* — Bhavesh Mehta
*Assistant Examiner* — Siamak Harandi
(74) *Attorney, Agent, or Firm* — VanLeeuwen & VanLeeuwen; Damian C. Josephs (57) ABSTRACT

Systems and computer program products provide surveillance including a modified video data stream. The systems and products include computer readable program code, when read by a processor, that is configured for receiving at an image processor a first video data stream and a second video data stream, each of the first and second video data streams may include a target object having an assigned tracking position tag. The code further includes extracting a first facial image of the target object from the first video data stream, determining a target object location in the second video data stream based at least in part on the tracking position tag and generating a modified video data stream including the first facial image superimposed on or adjacent to the target object location in the second video data stream.

7 Claims, 8 Drawing Sheets

(56) References Cited

OTHER PUBLICATIONS

T. Ellis, Multi-camera video surveillance, Dec. 10, 2002, 1 page, Security Technology, 2002. Proceedings. 36th Annual 2002 International Carnahan Conference.

Worldviz, PPTx Precision Position Tracker, Feb. 22, 2012, 2 pages, http://www.worldviz.com/products/ppt/index.html?gclid=M269OilzKoCFUlb6wodLBxHz.

H.B. Shitrit et al., "Multi-camera pedestrians video, 'EPFL' data set: multi-camera pedestrian videos," Internet web page cvlab.epfl.ch/data/pom/ , dated Feb. 18, 2013.

S. Stillman et al., "A System for Tracking and Recognizing Multiple People with Multiple Cameras," Georgia TR# GIT-GVU-98-25, and in Proceedings of Second International Conference on Audio-Visionbased Person Authentication, Aug. 1998.

* cited by examiner

SURVEILLANCE INCLUDING A MODIFIED VIDEO DATA STREAM

BACKGROUND

The present invention relates to generally to the field of surveillance and more specifically to the field of surveillance including a modified video data stream.

The field of surveillance technology has a possibly devastating effective cost of system failure. A single mistake or error can result in illegal activity resulting in theft of property or information, destruction of property, an attack, and loss of human life.

BRIEF SUMMARY

According to one embodiment of the present invention, a computer program product may include a computer readable storage medium having computer readable program code embodied therewith. The computer readable program code, when read by a processor, may be configured to receive at an image processor a first video data stream and a second video data stream, each of the first and second video data streams including a target object having an assigned tracking position tag, determine that the second video data stream includes an inferior facial view of the target object based at least in part on a face detection program, the inferior facial view being less than a facial view threshold, extract a first facial image of the target object from the first video data stream and generate a modified video data stream including the first facial image superimposed on or adjacent to a target object location in the second video data stream.

In some embodiments of the present invention, the computer readable program code may be further configured to determine the target object location in the second video data stream based at least in part on the tracking position tag. Additionally and/or alternatively, the computer readable program code may be further configured to assign the first facial image to the tracking position tag. Additionally and/or alternatively, the computer readable program code may be further configured to determine that the first video data stream includes an acceptable facial view of the target object based at least in part on the face detection program, the acceptable facial view meeting or exceeding the facial view threshold. Additionally and/or alternatively, the second imaging device may include a mobile imaging device.

In yet another embodiment of the present invention, a computer is provided. The computer may include a processor, a memory and/or a program including a plurality of instructions stored in the memory. The plurality of instructions may be executed by the processor to receive at the image processor a first video data stream and a second video data stream, each of the first and second video data streams including a target object having an assigned tracking position tag. The plurality of instructions may be further executed by the processor to extract a first facial image of the target object from the first video data stream, determine a target object location in the second video data stream based at least in part on the tracking position tag and generate a modified video data stream including the first facial image superimposed on or adjacent to the target object location in the second video data stream.

In some embodiments of the invention, the plurality of instructions may be further executed by the processor to assign the first facial image to the tracking position tag and store the first facial image and the tracking position tag in the memory. Additionally and/or alternatively, the plurality of instructions may be further executed by the processor to determine that the second video data stream includes an inferior facial view of the target object based at least in part on a face detection program, the inferior facial view being less than a facial view threshold.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
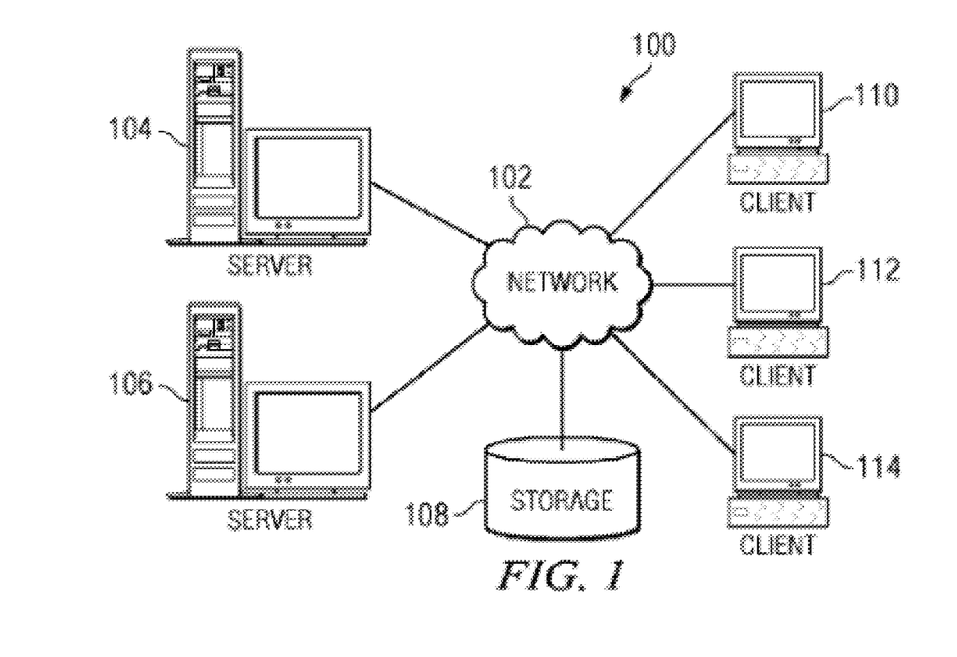
FIG. 1 is a pictorial representation of an example of a computer system in which illustrative embodiments may be implemented.
Figure 2:
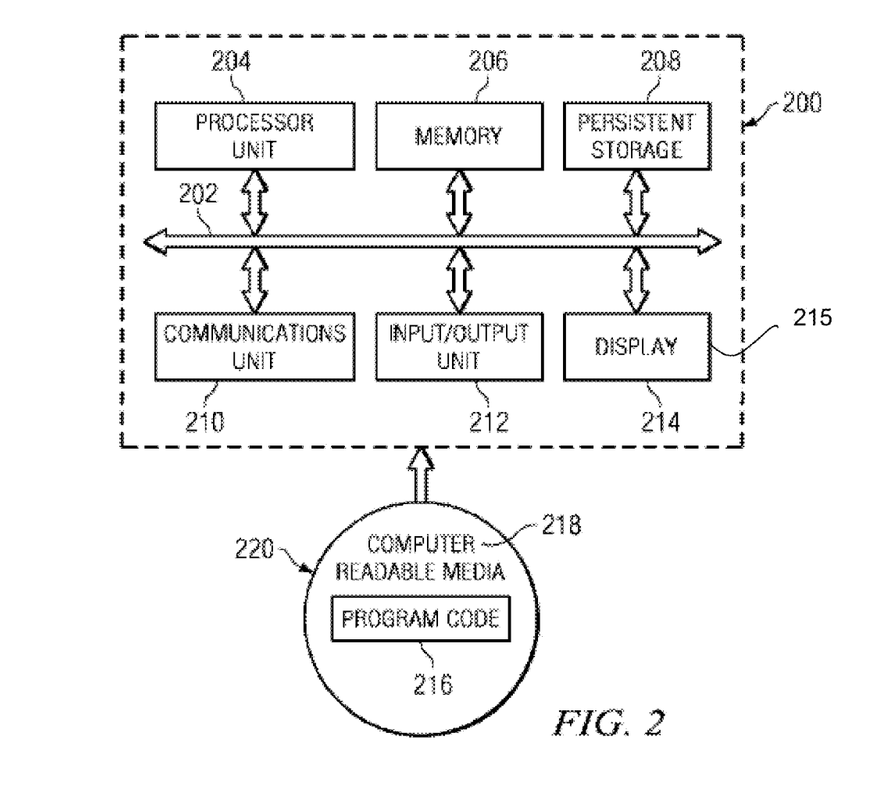
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers. In the depicted example, server 104 may provide data, such as boot files, operating system images, and/or software applications to client computers 110, 112, and 114. Client computers 110, 112, and 114 are clients to server 104 in this example. Computer system 100 may include additional servers, clients, and other devices not shown, or may include fewer devices than those shown.

In the depicted example, network 102 may be or may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer or a computer system, such as a server, a client computer, a gaming system, a personal digital assistant (pda), a smart phone, a mobile device or any other computer or device that functions like a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206 may include, for example, a random access memory or any other suitable volatile or non-volatile storage device. Persistent storage 208 may take various forms depending on the particular implementation. For example, persistent storage 208 may contain one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 may provide for communications with other data processing systems or devices and/or one or more networks such as a local area network (LAN), a general wide area network (WAN), and/or a public network (e.g., the Internet). Some embodiments of communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may provide a mechanism to display information to a user. Display 214 may include a touch screen 215.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on computer-readable media 218 that is selectively removable and may be loaded onto or transferred to data processing system 200 for execution by processor unit 204. Program code 216 and computer-readable media 218 may form computer program product 220. In one example, computer-readable media 218 may be in a tangible form, such as, for example, an optical or magnetic disc that is inserted or placed into a drive or other device that is part of persistent storage 208 for transfer on to a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 may include hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may include, for example, memory 206 or a cache such as found in an interface and memory controller hub that maybe present in communications fabric 202.

Systems, such as those illustrated in FIGS. 1 and 2 may be useful in the field surveillance technology. Systems 100, 200 may be incorporated in a variety of locations from airplanes, trains, corporate head quarters, government building, nuclear power plants, military facilities, stores, banks, intersections and any other potential targets or zones requiring security. Monitoring secure zones requires a tremendous amount of infrastructure: cameras, monitors, computers, networks, etc. This system then requires personnel to operate and monitor the security system. Even after all this investment and continuing operation cost, tracking a person or vehicle through an environment across multiple cameras is full of possibilities for human error.

Figure 3:
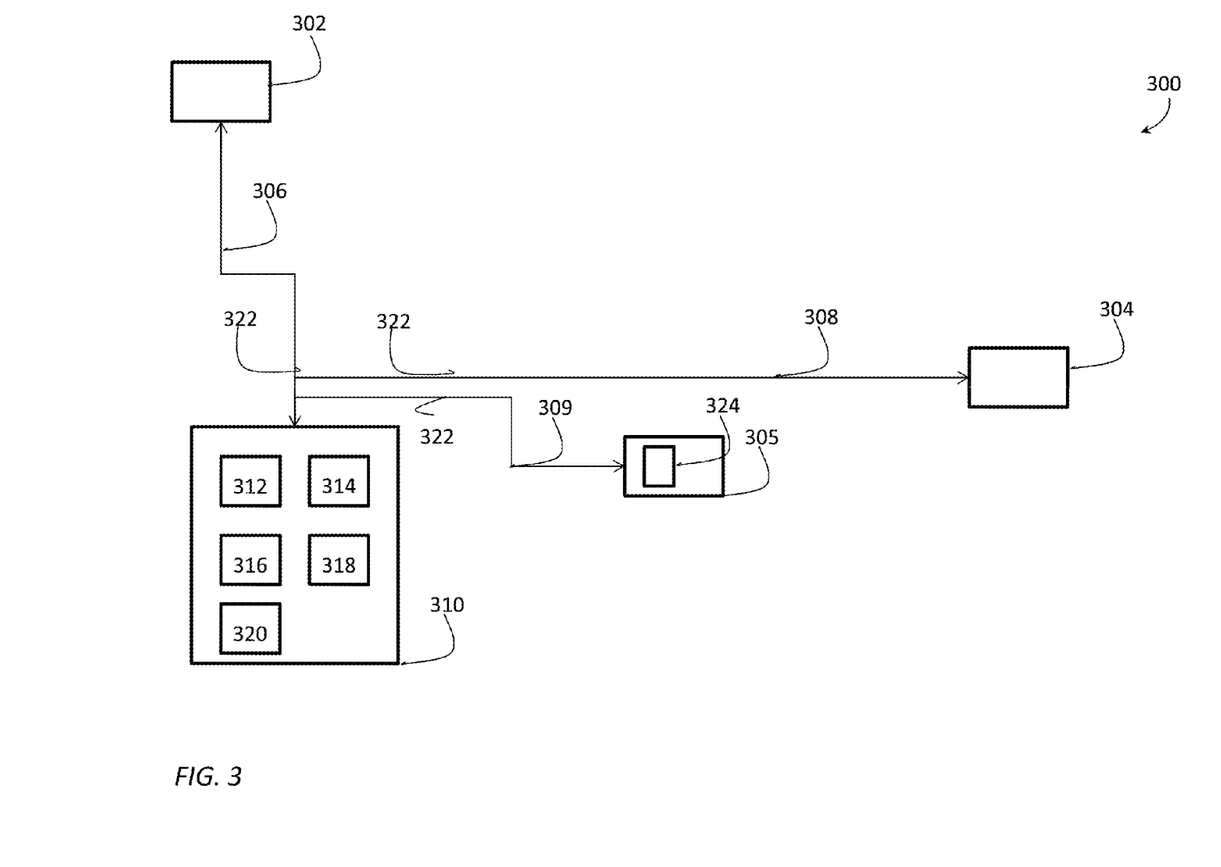
FIG. 3 is a block diagram of an example of a system in which illustrative embodiments may be implemented.

With reference now to FIG. 3, a surveillance system 300 may include multiple video cameras and/or other image capturing devices installed to cover a monitor area. For example, at a traffic intersection, a first, a second a third image capturing device 302, 304, 305 may be installed at different angles such that each device 302, 304, 305 may provide a first, a second and a third video data stream 306, 308, 309 respectively having a view or perspective of the monitor area. The video data streams 306, 308, 309 may be recorded for later viewing on a display, immediately viewed at a display at or near the camera and/or transmitted via any means known to those skilled in the art for remote viewing.

In the example shown in FIG. 3, the video data streams 306, 308, 309 are transmitted to an image processor 310. The image processor 310 may include one or more of a tracking module 312, a face extraction module 314, a memory 316, a display 318 and/or a modification module 320. Additionally and/or alternatively, in other embodiments, one or more of the image capturing devices 302, 304, 305 may include one or more of an image processor, a tracking module, a face extraction module, a memory and/or a modification module.

A target object, such as a person of interest, may be tracked using the tracking module 312 including tracking software known to those skilled in the art. The tracking software may be configured to track the target object across the multiple video data streams 306, 308, 309. For example, the target object may be assigned a unique tracking position tag. Based at least in part on the tracking position tag, the target object may be tracked across each of the video data streams 306, 308, 309. For example, a target object location in one of the video data streams may be determined based at least in part on the tracking position tag. The tracking position tag may be stored in memory or database 316.

The face extraction module 314 may include face capture software configured to extract a facial view of a target object in a video data stream, for example first video data stream 306. The facial view may be stored in the database 316. Additionally and/or alternatively, the facial view may be assigned to the tracking position tag.

In some embodiments, a face detection program may determine that a video data stream, for example a second video data stream 308, includes an inferior facial view of the target object. The face detection program may include a facial view threshold and the determination that the second video data stream 308 includes an inferior facial view may be based at least in part on the facial view being less than the facial view threshold. The facial view threshold may range from 0.0% facial view to 100% facial view.

In some embodiments, the face capture software may extract a plurality of facial views from one or more of the video data streams 306, 308, 309. The face detection program may rank the plurality of facial views. For example, the ranking may be based at least in part on a maximum coverage of the target object face. The maximum coverage of the target object face may be determined based on percentage of face viewable, lighting, focus, expression and/or any other factors known to those skilled in the art. The highest ranking facial image may be assigned to the tracking position tag and/or stored in the database.

The second video data stream 308 including a facial view below the threshold, i.e. an inferior facial view, may indicate that the target object face is not clearly visible in the second video data stream 308. The second video data stream 308 including the inferior facial view may be modified to include a superior facial view. The superior facial view may include one or more of a facial view assigned to the tracking position tag, a facial view extracted from the first video data stream 306 and/or a highest ranking facial view. For example, the modification module may generate a modified video data stream 322 including the superior facial view superimpose and/or overlay the superior facial view may be superimposed or overlaid on or adjacent to the location of the target object in the second video data stream. The modified video data stream 322 may be transmitted to one or more of the imaging devices 302, 304, 305 and/or viewed on display 318.

In some embodiments, the modified video data stream 322 may further include a directional icon, such as an arrow, adjacent the location of the target object in the second video data stream. The directional icon may be useful for example if there are a number of target objects and/or if the target object is partially or fully hidden behind a blocking object in the second video data stream.

In some embodiments, one or more of the image capturing devices 302, 304, 305 may include a mobile image capturing device. For example, the third image capturing device 305 may include a mobile image capturing device. The mobile image capturing device may include a mobile phone having a camera or any other mobile image capturing devices known to those skilled in the art. The mobile image capturing device may further include a mobile display 324.

The image processor 310 may receive video data stream 309 from the mobile image capturing device and may determine that the video data stream 309 includes an inferior facial view. The image processor 310 may generate modified video data stream 322 including a facial view overlaid on or adjacent to a target object location and may transmit the modified video data stream 322 to the mobile image capturing device. A user may view the modified video data stream on the mobile display 324. Accordingly, a remote mobile operator may view a facial view of a target object without having to change his or her position and/or draw attention to his or her self.

Figure 4:
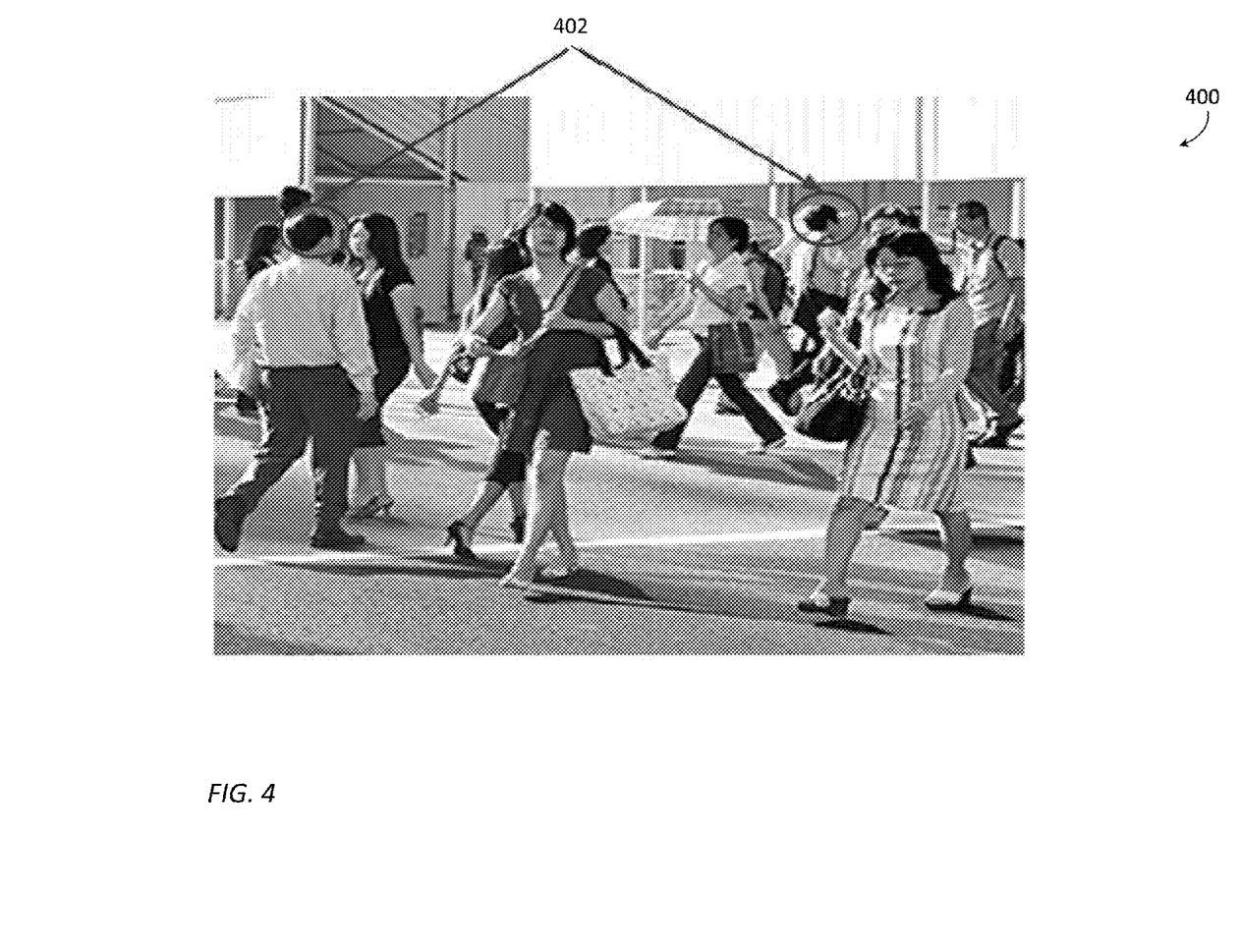
FIG. 4 is a pictorial representation of a video data stream including an inferior facial view of a target object.
Figure 5:
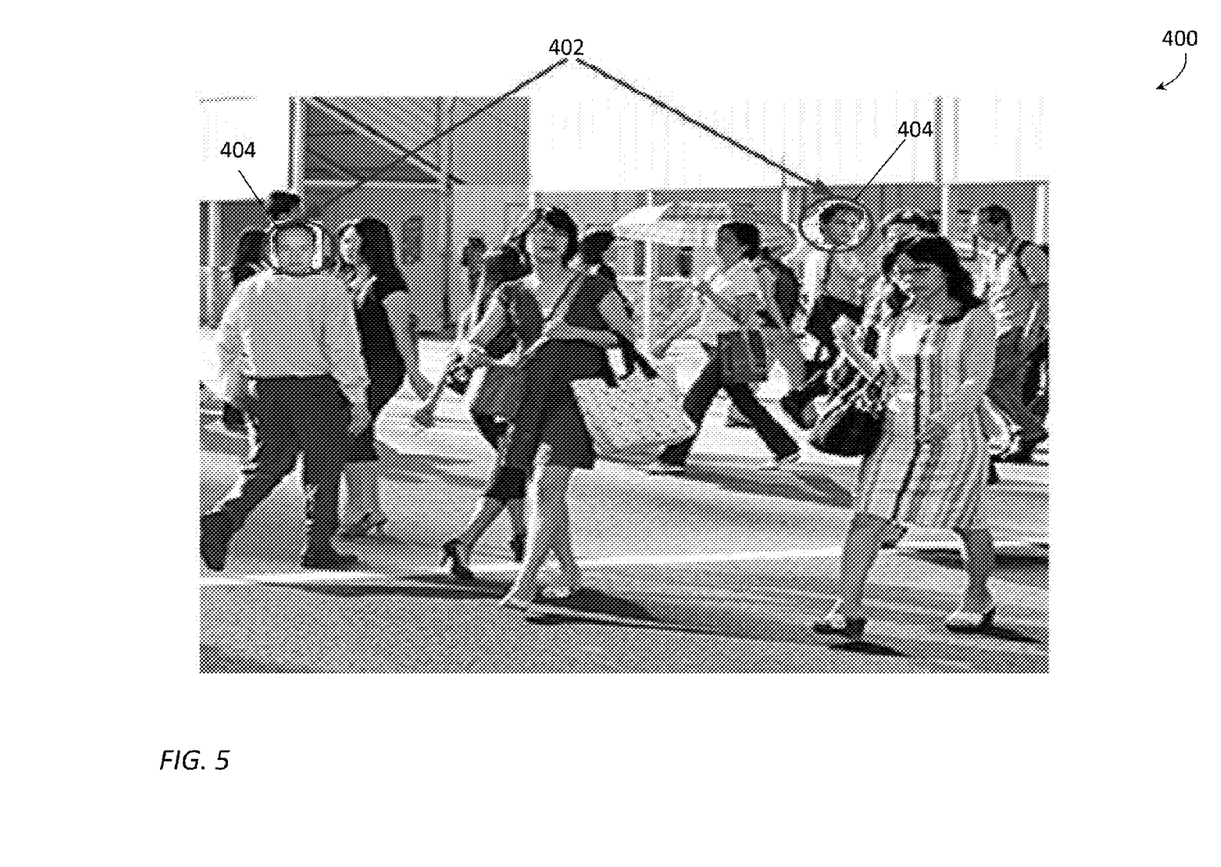
FIG. 5 is a pictorial representation of a modified video data stream including a superimposed facial view of a target object.

FIG. 4 shows a display 400 showing a second video data stream including two target objects 404 having target object locations. Both target objects 404 may be determined to include an inferior facial view because the faces of the target objects are not clearly visible in the second video data stream. FIG. 5 shows the display showing a modified video data stream including facial views 404 of the target objects 402 superimposed on the locations of the two target objects. A user viewing the modified video data stream is able to determine the identities of the two target objects instantly, without having to view another video data stream providing a different view or waiting for the two target objects to turn around.

Figure 6:
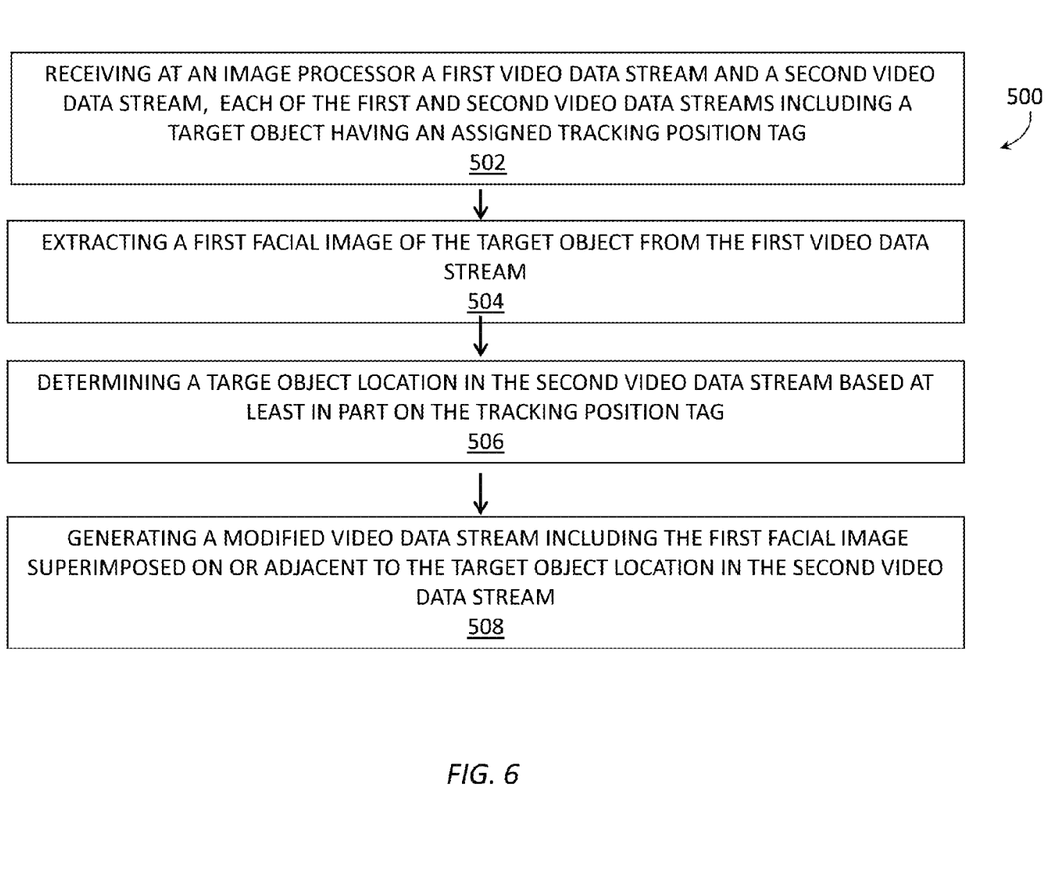
FIG. 6 is an example of a method of surveillance including a modified video data stream.

Referring now to FIG. 6, an example of a method 500, implemented in a computer system, of surveillance including a modified video data stream is provided. While FIG. 5 shows exemplary steps of a method according to one embodiment, other embodiments may omit, add to, and/or modify any of the steps shown in that figure. In step 502, a first video data stream and a second video data stream may be received at an image processor. Each of the first and second video data streams may include a target object having an assigned tracking position tag. In step 504, a first facial image of the target object may be extracted from the first video data stream. In step 506, a target object location in the second video data stream may be determined based at least in part on the tracking position tag. In step 508, a modified video data stream including the first facial image superimposed on or adjacent to the target object location in the second video data stream may be generated.

Method 500 may include other steps. For example, method 500 may include determining that the second video data stream includes an inferior facial view of the target object based at least in part on a face detection program, the inferior facial view being less than a predetermined facial view threshold. Additionally and/or alternatively, method 500 may include assigning the first facial image to the tracking position tag. Additionally and/or alternatively, method 500 may include displaying the modified video data stream on an image display. Additionally and/or alternatively, method 500 may include determining the tracking position tag based at least in part on utilization of an object tracking program and assigning the tracking position tag to the target object.

Additionally and/or alternatively, method 500 may include extracting a second facial image of the target object and ranking the first facial image and the second facial image, wherein the ranking is based at least in part on a maximum coverage of target object face. Additionally and/or alternatively, method 500 may include assigning the highest ranking of the first facial image and the second facial image to the tracking position tag. Additionally and/or alternatively, method 500 may include storing the first facial image and the tracking position tag in a database. Additionally and/or alternatively, method 500 may include superimposing a directional icon adjacent the location of the target object in the second video data stream.

Figure 7:
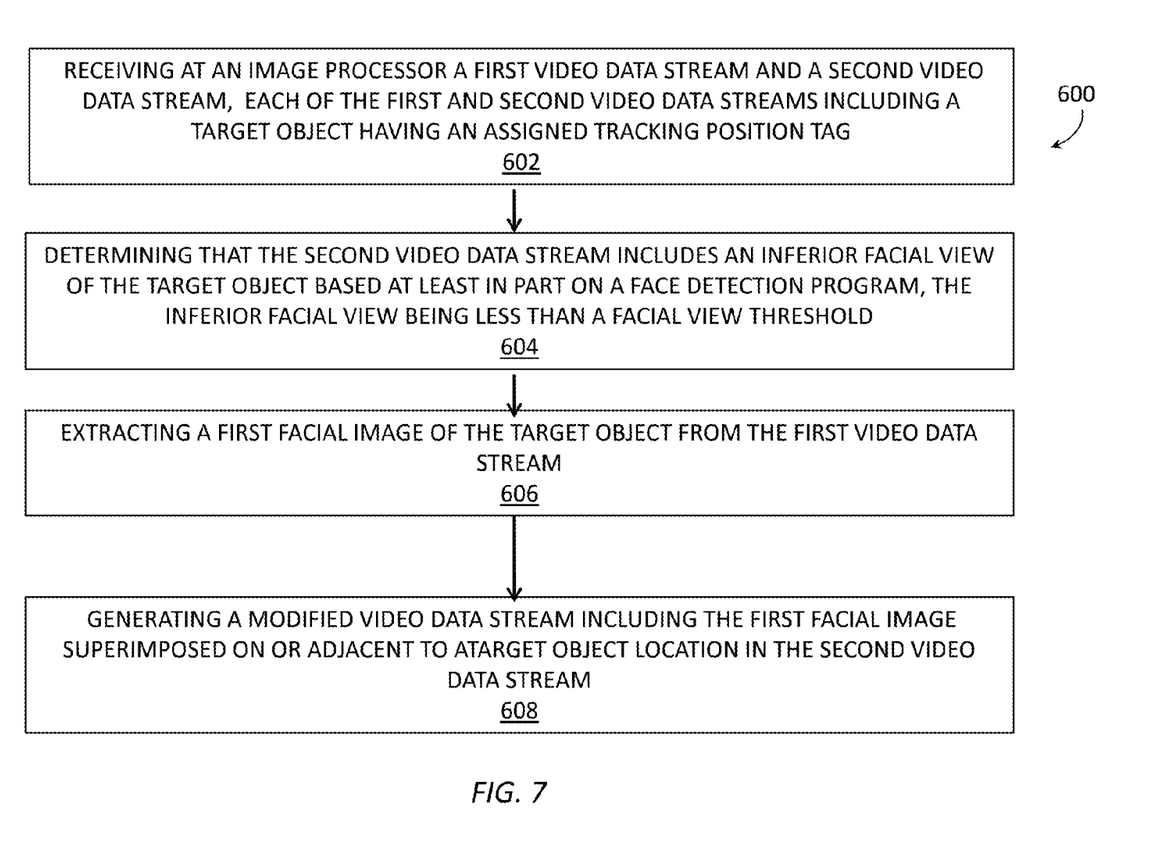
FIG. 7 is an example of a method of surveillance including a modified video data stream.

Referring now to FIG. 7, a further example of a method 600, implemented in a computer system, of surveillance including a modified video data stream is shown. While FIG. 7 shows exemplary steps of a method according to one embodiment, other embodiments may omit, add to, and/or modify any of the steps shown in that figure. In step 602, a first video data stream and a second video data stream may be received at an image processor. Each of the first and second video data streams may include a target object having an assigned tracking position tag. In step 604, the second video data stream may be determined to include an inferior facial view of the target object based at least in part on a face detection program. The inferior facial view may be less than a facial view threshold. In step 606, a first facial image of the target object may be extracted from the first video data stream. In step 608, a modified video data stream including the first facial image superimposed on or adjacent to a target object location in the second video data stream may be generated.

Method 600 may include other steps. For example, method 600 may include determining the target object location in the second video data stream based at least in part on the tracking position tag. Additionally and/or alternatively, the method 600 may include assigning the first facial image to the tracking position tag. Additionally and/or alternatively, the method 600 may include determining that the first video data stream includes an acceptable facial view of the target object based at least in part on the face detection program, the acceptable facial view meeting or exceeding the facial view threshold. Additionally and/or alternatively, the method 600 may include extracting a second facial image of the target object and ranking the first facial image and the second facial image, wherein the ranking is based at least in part on a maximum coverage of target object face. In some embodiments, the second imaging device may include a mobile imaging device.

Figure 8:
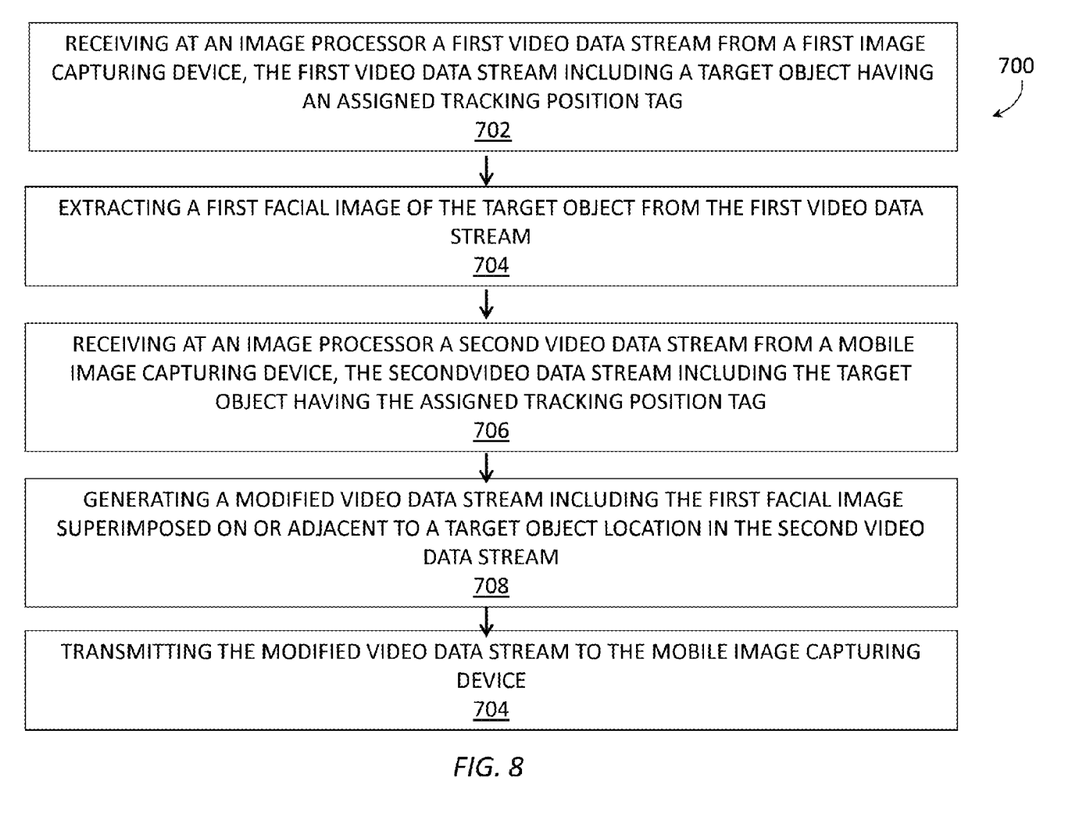
FIG. 8 is an example of a method of surveillance including a modified video data stream.

Referring now to FIG. 8, a further example of a method 700, implemented in a computer system, of surveillance including a modified video data stream is shown. While FIG. 8 shows exemplary steps of a method according to one embodiment, other embodiments may omit, add to, and/or modify any of the steps shown in that figure. In step 702, a first video data stream from a first image capturing device may be received at an image processor, the first video data stream may include a target object having an assigned tracking position tag. In step 704, a first facial image of the target object may be extracted from the first video data stream. In step 706, a second video data stream from a mobile image capturing device may be received at the image processor, the second video data stream may include the target object having the assigned tracking position tag. In step 708, a modified video data stream including the first facial image superimposed on or adjacent to a target object location in the second video data stream may be generated and in step 710, the modified video data stream may be transmitted to the mobile image capturing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments may be described as follows: The invention may include a multi-camera video surveillance system (in which a plurality of cameras record a location from different angles/positions). In a video stream from a first camera, if there are people whose faces are not clearly visible (including if the person is turned completely away from that camera), then the invention may pull a shot of the person's face from another camera in the surveillance system and may overlay that person's face on the video. This enables viewer of that video to easily track a person in the video without needing to view video from the other cameras in the system.

Some embodiments of the system may be capable of overlaying a best possible face of any person when his face is not clearly visible from an angle. Some embodiments of the system may include a mobile phone camera, wherein the mobile phone camera may be directed to a group of people standing backward, and a clear visible face of those persons will be overlaid.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising:
at least one computer readable storage medium having computer readable program code embodied therewith, the computer readable program code, when read by a processor, configured to:
receive at an image processor a first video data stream corresponding to a first viewing angle and a second video data stream corresponding to a second viewing angle, each of the first and second video data streams including a target object having an assigned tracking position tag;
extract a first facial image of the target object from the first video data stream; and
in response to determining that the second video data stream includes an inferior facial view of the target object based at least in part on a face detection program, the inferior facial view having a facial coverage area resulting from the second viewing angle being less than a facial view threshold, generate a modified video data stream including the first facial image from the first viewing angle superimposed on or adjacent to a target object location in the second video data stream.

2. The computer program product of claim 1 wherein the computer readable program code, when read by a processor, is further configured to:
determine the target object location in the second video data stream based at least in part on the tracking position tag.

3. The computer program product of claim 1 wherein the computer readable program code, when read by a processor, is further configured to:
   assign the first facial image to the tracking position tag.

4. The computer program product of claim 1 wherein the computer readable program code, when read by a processor, is further configured to:
   determine that the first video data stream includes an acceptable facial view of the target object based at least in part on the face detection program, the acceptable facial view having a different facial coverage area resulting from the first viewing angle meeting or exceeding the facial view threshold.

5. The computer program product of claim 1 wherein the second imaging device includes a mobile imaging device.

6. A computer, comprising:
   an image processor;
   a memory; and
   a program including a plurality of instructions stored in the memory that are executed by the processor to:
      receive at an image processor a first video data stream corresponding to a first viewing angle and a second video data stream corresponding to a second viewing angle, each of the first and second video data streams including a target object having an assigned tracking position tag;
      extract a first facial image of the target object from the first video data stream; and
      in response to determining that the second video data stream includes an inferior facial view of the target object based at least in part on a face detection program, the inferior facial view having a facial coverage area resulting from the second viewing angle being less than a facial view threshold, generate a modified video data stream including the first facial image from the first viewing angle superimposed on or adjacent to a target object location in the second video data stream.

7. The computer of claim 6, wherein the plurality of instructions further includes instructions that are executed by the processor to:
   assign the first facial image to the tracking position tag; and
   store the first facial image and the tracking position tag in the memory.

* * * * *